United States Patent
Kieninger et al.

(10) Patent No.: US 9,623,916 B2
(45) Date of Patent: Apr. 18, 2017

(54) ENGINE-TRANSMISSION CONNECTION BY MEANS OF ADHESIVE TAPE

(71) Applicant: IMS GEAR SE & Co. KGaA, Donaueschingen (DE)

(72) Inventors: Matthias Kieninger, Unterkirnach (DE); Heinz Gert Hagedorn, Moos-Iznang (DE)

(73) Assignee: IMS GEAR SE & CO. KGaA, Donaueschingen (DE)

( * ) Notice: Subject to any disclaimer, the term of this patent is extended or adjusted under 35 U.S.C. 154(b) by 0 days.

(21) Appl. No.: 14/753,805

(22) Filed: Jun. 29, 2015

(65) Prior Publication Data

US 2016/0001826 A1 Jan. 7, 2016

(30) Foreign Application Priority Data

Jul. 4, 2014 (DE) .......................... 10 2014 109 416

(51) Int. Cl.
| | | |
|---|---|---|
| *F16H 57/08* | (2006.01) | |
| *B62D 33/027* | (2006.01) | |
| *F16H 1/28* | (2006.01) | |
| *F16H 57/02* | (2012.01) | |
| *E05F 15/611* | (2015.01) | |

(52) U.S. Cl.
CPC ........ *B62D 33/0273* (2013.01); *E05F 15/611* (2015.01); *F16H 1/28* (2013.01); *F16H 57/02* (2013.01); *E05Y 2600/526* (2013.01); *E05Y 2800/232* (2013.01); *E05Y 2900/546* (2013.01); *F16H 2057/02082* (2013.01)

(58) Field of Classification Search
CPC .... B62D 33/0273; E05F 15/611; F16H 57/02; F16H 1/28; F16H 2057/02082
See application file for complete search history.

(56) References Cited

U.S. PATENT DOCUMENTS

| | | | | |
|---|---|---|---|---|
| 5,787,550 | A  * | 8/1998 | Bender | ................. E05D 5/0207 |
| | | | | 16/382 |
| 9,255,436 | B2 * | 2/2016 | Schonherr | ............. E05F 15/622 |
| 2008/0271552 | A1* | 11/2008 | Arenz | ..................... F16H 25/20 |
| | | | | 74/89.23 |
| 2010/0186528 | A1* | 7/2010 | Hillen | .................... F16D 7/044 |
| | | | | 74/89.23 |
| 2011/0290050 | A1* | 12/2011 | Kummer | ............... E05F 15/622 |
| | | | | 74/89.37 |

(Continued)

FOREIGN PATENT DOCUMENTS

| | | |
|---|---|---|
| DE | 3823404 A1 | 1/1990 |
| DE | 201 15 752 U1 | 11/2001 |

(Continued)

OTHER PUBLICATIONS

German Office Acton issued in corresponding German Application No. 10 2014 109 416.6, Apr. 27, 2015.

*Primary Examiner* — David J Hlavka
(74) *Attorney, Agent, or Firm* — Juneau & Mitchell

(57) ABSTRACT

A device comprising a first housing having a first flange for accommodating an engine, a second housing with a second flange for holding a transmission as well as connection device between the first flange and the second flange arranged as a flat disk connection, which connects the first flange with the second flange horizontally, wherein the connection device is double-sided adhesive tape.

11 Claims, 2 Drawing Sheets

(56) References Cited

U.S. PATENT DOCUMENTS

| | | | |
|---|---|---|---|
| 2012/0222357 A1* | 9/2012 | Elliott | B62D 33/0273 49/383 |
| 2015/0052706 A1* | 2/2015 | Kalis | E05D 5/04 16/224 |
| 2016/0047160 A1* | 2/2016 | Huynh | E05F 15/77 49/31 |
| 2016/0104585 A1* | 4/2016 | Clemente | F16P 3/12 200/600 |

FOREIGN PATENT DOCUMENTS

| | | |
|---|---|---|
| DE | 10 2011 006 893 A1 | 4/2011 |
| EP | 1 646 128 A1 | 4/2006 |

\* cited by examiner

ENGINE-TRANSMISSION CONNECTION BY MEANS OF ADHESIVE TAPE

CROSS REFERENCE TO RELATED APPLICATIONS

This patent application claims priority to German Patent Application 10 2014 109 416.6, filed on Jul. 4, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a device for mechanical connecting of a first housing with a second housing.

Background of the Invention

Devices like the present invention are used, for example, to connect the housing of an engine with the housing of a transmission. The engine housing can be flanged by means of a flange on the transmission, for example.

However, vibrations are frequently transmitted via the flange, both from the engine to the transmission as well as from the transmission to the engine, causing loud and often unpleasant noise. Another problem is the often costly and technically complex screwed connection of the engine with the engine flange. As a rule, the engine flange must first be screwed with the engine before the transmission can be laser-welded or pinned, for example. This means that it is not possible to mount and send the transmission without the engine. This leads to serious limitations in the global logistics of engines and engine-transmission units.

Consequently, the object of the present invention is to provide a device which does not have these disadvantages. This object is achieved by a device as described herein.

BRIEF SUMMARY OF THE INVENTION

In a preferred embodiment, a device comprising a first housing having a first flange for accommodating an engine, a second housing with a second flange for holding a transmission as well as a connection device between the first flange and the second flange arranged as a flat disk connection, which connects the first flange with the second flange horizontally, wherein the connection device is double-sided adhesive tape.

In another preferred embodiment, the device as described herein, wherein either or both of (i) the first flange with the first housing and (ii) the second flange with the second housing, is designed as one piece.

In another preferred embodiment, the device as described herein, wherein the connection device and the first housing and the second flange have centric recesses for passing the pinion of an engine through them.

In another preferred embodiment, the device as described herein, wherein the connection device has at least one non-centric borehole.

In another preferred embodiment, the device as described herein, wherein one of the two flanges has at least one, preferably pin-shaped structure, which engages through at least one non-centric borehole of the connection device and engages the other of the two flanges positively in a recess corresponding to the structure.

In another preferred embodiment, the device as described herein, wherein the second housing has a gear.

In another preferred embodiment, the device as described herein, wherein the gear is a planetary gear.

In another preferred embodiment, the device as described herein, wherein the first housing can be joined by pins radially with the second housing, they can be welded and/or they can be screwed together.

In another preferred embodiment, the device as described herein, wherein the first housing has an engine that engages the transmission.

In another preferred embodiment, a tailgate drive for opening and closing the tailgate of a vehicle, comprised of the device as described herein.

In another preferred embodiment, a process for manufacturing the device as described herein, comprised of the following steps:
a) installation of a transmission in second housing,
b) connection of the second flange with the first flange using double-sided adhesive tape arranged between the first and the second flange, and
c) welding of the second housing or the second flange with the first housing or the first flange.

DETAILED DESCRIPTION OF THE INVENTION

Figure 1:
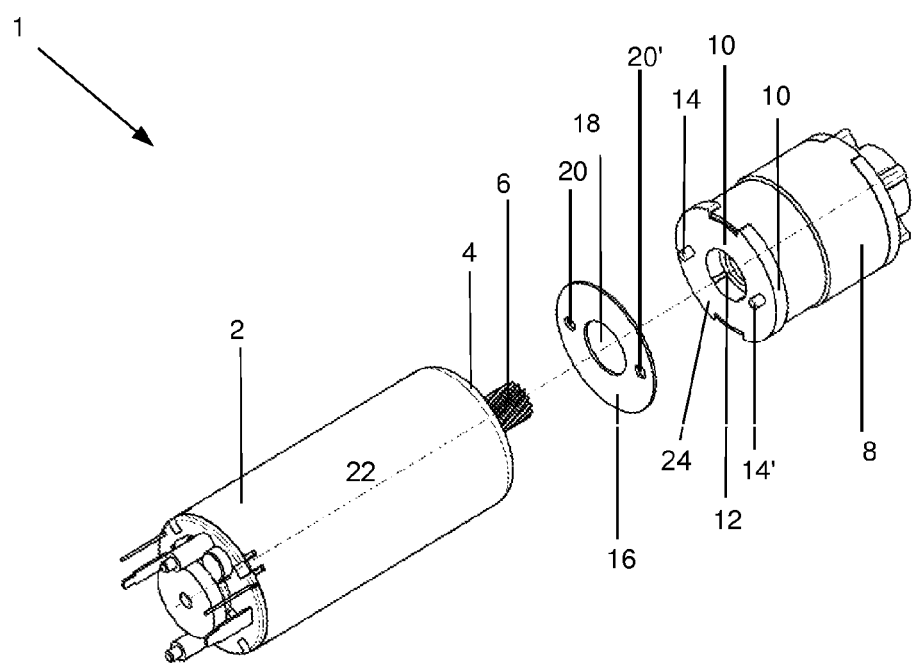
FIG. 1 is a line drawing evidencing an exploded perspective view of an inventive engine-transmission unit.

The invented device includes a first housing with a first flange for holding an engine, a second housing with a second flange for holding a transmission as well as a connection device arranged as a flat disk connection device between the first flange and the second flange, which connects the first flange with the second flange horizontally. According to the invention, this connection device is a double-sided adhesive tape or a double adhesive tape. Such a tape is elastic and therefore dampens the vibrations already transmitted between the engine and transmission.

The connecting device may be annular in shape or be designed as a disk, which is arranged between the two flanges. In an advantageous embodiment, the first flange with the first housing is designed as one piece and/or the second flange with the second housing is designed as one piece. This eliminates the technically complicated screwing of the flange to the housing.

The connection device advantageously comprises at least one recess for the passing through of the pinion of an engine; it is preferably designed ring-shaped and has a centric recess. The pinion of the engine can preferably also be passed through a centric recess in the first and/or second flange.

The connection device also has at least one non-centric borehole; in this case, at least one of the two flanges has an at least pin-shaped structure, which passes through at least one non-centric borehole of the connection device and engages positively in an opening corresponding to the structure of the other flange. Such a structure can ensure that when an engine is arranged in the first housing, which engages with a transmission arranged in a second housing, that both housings are torque-proof with respect to each other at engine operation.

The first housing can be joined by pins radially with the second housing, they can be welded and/or they can be screwed together.

For an easier mounting of an electric engine on a mounted transmission unit, which preferably has already been arranged and welded in the second housing, the connection device (the double-side adhesive tape) can be arranged between the first housing, i.e., the engine housing, and the transmission housing, and the parts joined by pressing together.

Subsequently, the engine flange can be pressed, e.g., with a hold-down device flat on the gearbox flange, (for example, on the sprocket side of the transmission), and connected securely with the transmission flange or transmission housing. For example, this can be done using a welding process, a laser welding process, or even by pinning transmission housing and engine housing together.

The engine must not be already connected with the engine flange or be arranged in the engine housing during the connection process. Following the above procedure in the first housing, for example, during final assembly, it can also be first installed or plugged in by the customer in such a way that it engages the transmission unit in the second housing.

As a result, the assembly is on the one hand easier, and on the other hand the double adhesive tape arranged between the engine unit and the transmission unit ensures that engine and transmission vibrations are uncoupled from one another.

Such a mounted engine-transmission unit can be used as a tailgate drive for opening and/or closing the rear tailgate 26 of a vehicle 28, for example.

DETAILED DESCRIPTION OF THE FIGURES

FIG. 1 shows the invented device 1 in an exploded view. In a first housing 2, which has a first flange 4, an engine 22 is arranged, the motor pinion 6 of which is guided through an opening in the first flange 4. In a second housing 8, a gear (a planetary gear in this case) is arranged. The second housing 8 has a second flange 10 on the front, which has an opening 12 for holding the engine pinion 6. The second flange 10 is comprised of two pin-shaped structures 14, 14', which may be engaged with two receptacles not shown in the present example in the first flange 4. A connection device 16 is arranged between the first housing 2 and the second housing 8, which is constructed disk-shaped as a double-sided adhesive tape or as double adhesive tape and has a centric recess 18 for passing engine pinion 6 through it. Two additional boreholes 20, 20' are in connection device 16, which serve for passing structures 14, 14' through the second flange 10. If the engine housing 2 is now connected to the transmission housing 8, the engine pinion 6 of the engine 22 arranged in first housing 2 engages the connection device 16 through the centric recess 18 of the connection de-vice 16 and through the opening 12 in the second flange 10 in the transmission 24 arranged in the second housing 8. The structures 14, 14' on the second flange 10 pass through the two through boreholes 20, 20' of connection device 16 and engage positively in the recesses not shown in the first flange 4. Because the connection device 16 is double-sided adhesive tape, an adhesive connection is created between the first housing 2 and the second housing 8 when the first housing 2 is pressed onto the second housing 8. Because the structures 14, 14' engage the corresponding recesses in the first flange 4 of the first housing 2, a torque-proof connection is created between the first housing 2 and the second housing 8.

Figure 2:
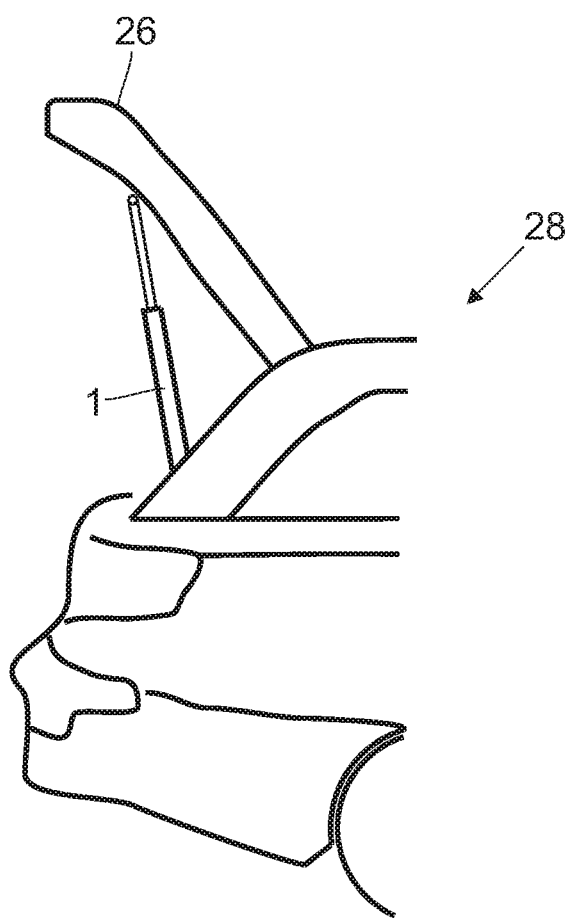
FIG. 2 is a line drawing evidencing the engine-transmission unit of FIG. 1 interacting with a tailgate and vehicle.

FIG. 2 is a line drawing evidencing the engine-transmission unit of FIG. 1 interacting with a tailgate 26 and vehicle 28.

The invention has been explained using an exemplary embodiment, but is not limited to this embodiment. For example, a planetary gear or another gear may be arranged in the second housing. For example, structures 14 may be shaped as cylindrical pins, but they may also have a different shape. The second housing 8 may be integrally designed with the second flange 10 and the first housing 2 may be designed as one piece with the first flange 4, but it is also possible that the first flange 4 is not constructed as one piece with the first housing 2, for example. Consequently, specialists can create numerous modifications and embodiments of the invented device without deviating from the invention idea.

LIST OF REFERENCE NUMBERS

1 Device
2 First housing
4 First flange
6 Engine pinion
8 Second housing
10 Second flange
12 Opening
14, 14' Structure
16 Connection device
18 Centric recess
20, 20' Borehole
22 Engine
24 Transmission
26 Tailgate
28 Vehicle The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A device comprising a first housing having a first flange for accommodating an engine, a second housing with a second flange for holding a transmission as well as a connection device between the first flange and the second flange arranged as a flat disk connection, which horizontally connects the first flange with the second flange, wherein the connection device is double-sided adhesive tape.

2. The device of claim 1, wherein either or both of (i) the first flange with the first housing and (ii) the second flange with the second housing, is designed as one piece.

3. The device of claim 1, wherein the connection device and the first housing and the second flange have centric recesses for passing the pinion of an engine through them.

4. The device of claim 1, wherein the connection device has at least one non-centric borehole.

5. The device of claim 1, wherein one of the two flanges has at least one, preferably pin-shaped structure, which engages through at least one non-centric borehole of the connection device and engages the other of the two flanges positively in a recess corresponding to the structure.

6. The device of claim 1, wherein the second housing has a transmission consisting of a gear.

7. The device of claim 6, wherein the gear is a planetary gear.

8. The device of claim 6, wherein the first housing can be joined by pins radially with the second housing, they can be welded and/or they can be screwed together.

9. The device of claim 6, wherein the first housing has an engine that engages the transmission.

10. A tailgate drive for opening and closing the tailgate of a vehicle, comprised of the device of claim 9.

11. A process for manufacturing the device of claim 1, comprised of the following steps:
   a) installation of a transmission in second housing,
   b) connection of the second flange with the first flange using double-sided adhesive tape arranged between the first and the second flange, and
   c) welding of the second housing or the second flange with the first flange.

* * * * *